United States Patent
Hetzler et al.

(10) Patent No.: US 6,979,027 B2
(45) Date of Patent: Dec. 27, 2005

(54) TOILET CARRIER

(75) Inventors: Roy Hetzler, Hendersonville, NC (US); Bushra Awad Ghaly, Burlington (CA)

(73) Assignee: Watts Regulator Co., North Andover, MA (US)

( * ) Notice: Subject to any disclaimer, the term of this patent is extended or adjusted under 35 U.S.C. 154(b) by 96 days.

(21) Appl. No.: 10/430,432

(22) Filed: May 7, 2003

(65) Prior Publication Data

US 2004/0222628 A1 Nov. 11, 2004

(51) Int. Cl.$^7$ ............................................. F16L 35/00
(52) U.S. Cl. ...................... 285/337; 285/374; 4/252.1; 4/252.4; 4/252.6
(58) Field of Search .................. 285/337, 374; 4/252.1, 252.2, 252.3, 252.4, 252.5, 252.6

(56) References Cited

U.S. PATENT DOCUMENTS

| | | | |
|---|---|---|---|
| 897,914 A * | 9/1908 | Madden ........................ 4/311 |
| 1,051,086 A * | 1/1913 | Clark ........................ 285/373 |
| 1,211,471 A * | 1/1917 | Mann ........................ 4/252.2 |
| 1,497,171 A * | 6/1924 | Haas ........................ 4/252.2 |
| 1,676,276 A * | 7/1928 | Moore ........................ 285/10 |
| 2,096,240 A | 10/1937 | Groeniger |
| 2,138,135 A | 11/1938 | Boucher |
| 2,145,645 A | 1/1939 | Byers |
| 2,170,393 A | 4/1939 | Tornblom |
| 2,373,280 A | 4/1945 | Weber |
| 2,438,234 A | 3/1948 | Stewart |
| 2,480,858 A | 9/1949 | Hobbs |
| 2,539,932 A | 9/1951 | Schmitz, Jr. |
| 2,657,079 A | 10/1953 | David |
| 2,702,391 A * | 2/1955 | Schmid ........................ 4/252.2 |
| 2,810,918 A | 10/1957 | Baker et al. |
| 2,901,754 A | 9/1959 | Manas |
| 2,932,037 A * | 4/1960 | Manas ........................ 4/252.3 |
| 2,957,717 A | 10/1960 | Bram |
| 3,058,763 A | 10/1962 | Nott |
| 3,078,477 A * | 2/1963 | Schmid et al. ............... 4/252.3 |
| 3,141,686 A | 7/1964 | Smith et al. |
| 3,257,118 A | 6/1966 | Broadhead et al. |
| 3,268,919 A * | 8/1966 | Pope ........................ 4/252.2 |
| 3,298,720 A | 1/1967 | Driancourt |
| 3,319,267 A | 5/1967 | Pope |
| 3,398,979 A | 8/1968 | Pope |
| 3,400,411 A * | 9/1968 | Harvey ........................ 4/252.6 |
| 3,540,065 A * | 11/1970 | Schmid et al. ................. 4/420 |
| 3,547,471 A | 12/1970 | Dunmire |
| 3,664,690 A | 5/1972 | Williams, III et al. |
| 3,686,695 A * | 8/1972 | Mielback et al. ............ 4/252.3 |
| 3,732,582 A | 5/1973 | Mielbeck et al. |
| 4,092,036 A | 5/1978 | Sato et al. |
| 4,108,477 A | 8/1978 | Morris |
| 4,482,161 A | 11/1984 | Izzi, Sr. |
| 4,502,166 A | 3/1985 | Brown, Sr. |
| 4,538,307 A * | 9/1985 | Barnum et al. ................. 4/427 |
| 4,544,188 A | 10/1985 | Dugger |
| 4,647,083 A | 3/1987 | Hashimoto |
| 4,874,192 A | 10/1989 | Key |
| 4,967,425 A * | 11/1990 | Kawamura et al. ............ 4/619 |
| 4,984,308 A | 1/1991 | Handal |
| 5,398,980 A | 3/1995 | Hunter et al. |
| 5,502,845 A * | 4/1996 | Hayashi et al. ................. 4/300 |
| 5,887,913 A | 3/1999 | Kojima et al. |
| 6,000,070 A | 12/1999 | Bonin |
| 6,301,838 B1 * | 10/2001 | Hall ............................... 52/34 |
| 6,496,989 B1 | 12/2002 | Meiser |
| 6,679,460 B2 * | 1/2004 | Nicolia et al. ............. 248/74.1 |

FOREIGN PATENT DOCUMENTS

| JP | 53-134225 | * 11/1978 | ................. 285/337 |
|---|---|---|---|
| JP | 53-134226 | * 11/1978 | ................. 285/337 |

OTHER PUBLICATIONS

Simplicity One-Piece Carrier, Western Foundry, Division of Woodward Company A Division of The Mead Corporation, Simplicity Catalog circa 1963, 3 pages.

* cited by examiner

*Primary Examiner*—Eric K. Nicholson
(74) *Attorney, Agent, or Firm*—Fish & Richardson P.C.

(57) ABSTRACT

A toilet carrier for supporting a wall-hung toilet can include a smooth pipe nipple that attaches a toilet to a waste pipe. A seal can be formed with the pipe nipple at the waste pipe end using a gasket compression seal, where a gasket is compressed between two opposing flanges encircling the pipe nipple, forcing a seal to be formed with the pipe nipple.

22 Claims, 7 Drawing Sheets

TOILET CARRIER

TECHNICAL FIELD

This invention relates to a toilet carrier, and more particularly to a wall hung toilet carrier.

BACKGROUND

Many toilets are arranged to connect to the drain through the floor of the room in which they are kept. Such toilets can rely on the floor to support the weight of their components and to assist in making a seal with the waste pipe. Wall hung toilets connect to a waste pipe through a wall rather than through the floor and thus face different challenges, particularly in making a seal with the waste pipe. A wall hung toilet connector facilitates attachment of a wall hung toilet to a waste pipe. A typical connector supports the toilet off the floor and includes a threaded seal between the toilet and the waste pipe.

SUMMARY

According to one aspect of the invention, a plumbing system includes a wall hung toilet and a waste pipe with a toilet carrier coupling the toilet to the waste pipe. The toilet carrier includes a connecting pipe positioned to place the toilet and waste pipe in fluid communication and at least a portion of the connecting pipe has a smooth outer wall. The toilet carrier has a first flange positioned about the smooth portion of the connecting pipe, a second flange positioned about the smooth portion of the connecting pipe and opposing the first flange, and a gasket positioned between the first and second flanges.

Embodiments of this aspect of the invention may include one or more of the following features. The gasket is made of neoprene. The toilet is, for example, a siphon jet toilet or a blowout toilet.

The toilet carrier has a faceplate attached to the toilet, and the faceplate includes the first flange. The plumbing system includes a frame attached to the faceplate that permits vertical adjustment of the position of the faceplate.

In an illustrated embodiment, the gasket has a trapezoidal cross-section. The gasket can has a first surface in contact with the second flange, an angled, second surface in contact with the first flange, a flat, third surface in contact with the first flange, and a flat, fourth surface forming a seal with the portion of the connecting pipe. The plumbing system includes a fastener for adjusting the relative position of the first and second flanges such that the flanges compress the gasket to form a seal.

According to another aspect of the invention, a wall hung toilet carrier for coupling a wall hung toilet to a waste pipe includes a connecting pipe positioned to place the toilet and waste pipe in fluid communication. At least a portion of the connecting pipe has a smooth outer wall. The toilet carrier further includes a first flange positioned about the smooth portion of the connecting pipe, a second flange positioned about the smooth portion of the connecting pipe and opposing the first flange, and a gasket positioned between the first and second flanges.

According to another aspect of the invention a sealing device includes a pipe having at least a portion with a smooth outer wall, a first flange positioned about the smooth portion of the pipe, a second flange positioned about the smooth portion of the pipe and opposing the first flange, a gasket with a trapezoidal cross-section positioned between the two flanges, where the gasket has i) a flat surface in contact with the second flange, ii) an angled surface in contact with the first flange, iii) a flat surface in contact with the first flange, and iv) a flat surface forming a seal with the portion of the pipe. The sealing device includes a fastener for adjusting the relative position of the first and second flanges such that the flanges compress the gasket to form a seal.

Advantages of the invention may include a leak proof seal between the pipe nipple and the waste pipe. Previous designs use a threaded connection at the pipe nipple-waste drain connection that has historically been prone to leaking. The advantages of the invention are that the seal formed is leak proof and that the seal is easily adjustable without the threads and sealing compounds common to other marketed wall hung carriers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
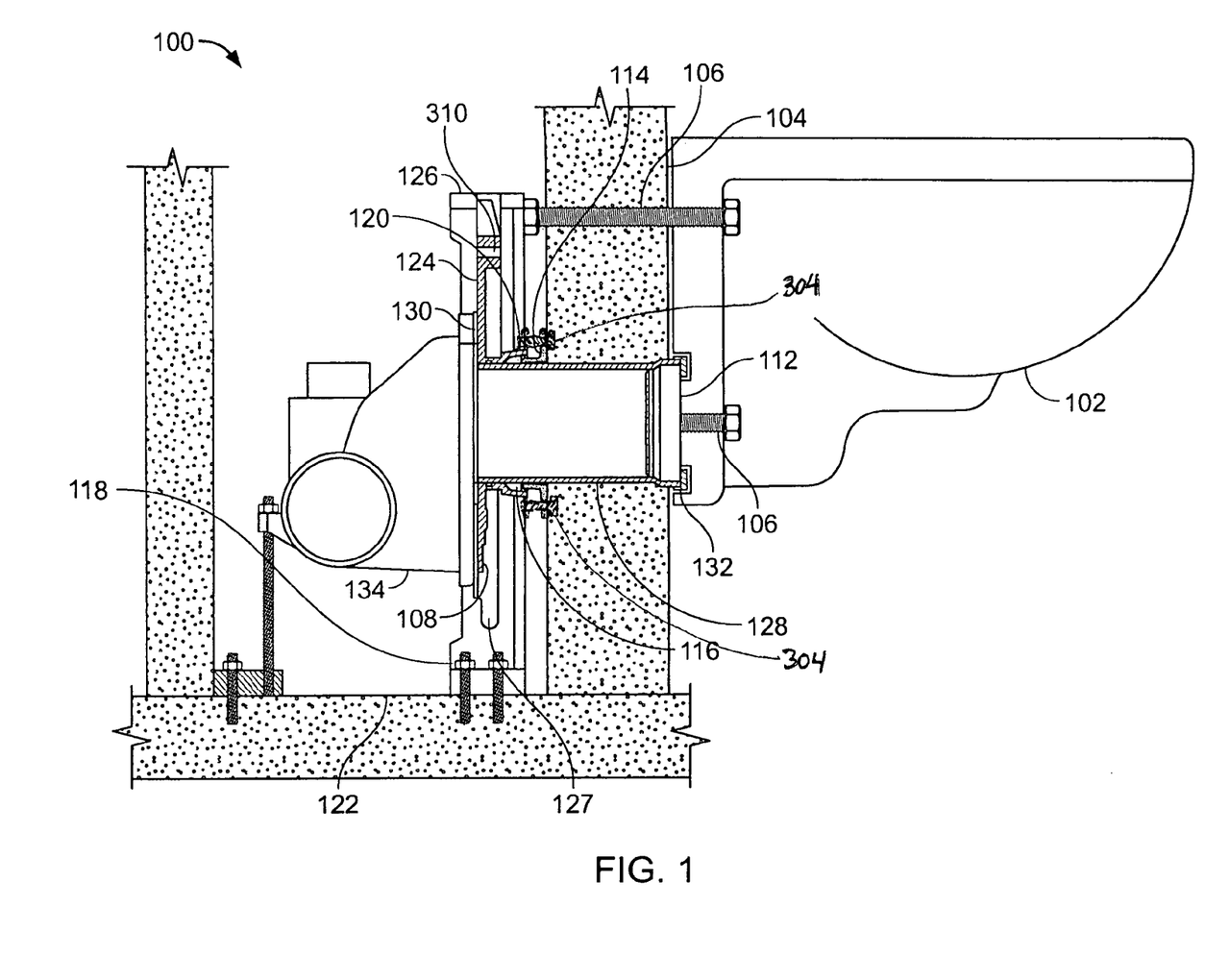
FIG. 1 is a schematic of a plumbing system showing a cross-section of a wall hung toilet carrier taken along lines 1—1 in FIG. 3.

Referring to FIG. 1, a wall hung toilet carrier 100 extends through a bathroom wall 104 to support a wall-hung toilet 102. Toilet 102 is secured to toilet carrier 100 by four support screws 106 (only two being shown in the cross section of FIG. 1) that extend from the toilet 102 through the wall 104 and through a faceplate 124 of the wall hung toilet carrier 100. The faceplate 124 attaches to a frame 126 that includes carrier feet 118 to secure the carrier 100 to the floor 122. The frame 126 allows for the faceplate 126 to be positioned at a variety of vertical positions, as discussed below. The toilet carrier 100 includes a pipe nipple 112 for connecting the toilet 102 to a waste pipe 134. Nipple 112 extends from the toilet 102 through the wall 104 and through the faceplate 124 of carrier 100 to the waste pipe 134. The faceplate 124 forms a seal with the waste pipe via a fitting gasket 130. The nipple 112 forms a seal with the toilet via a bowl gasket 132. The carrier 100 has positioning notches 108 (described in detail below) that allow for the carrier 100 to be vertically positioned through a plurality of vertical positions to match the height of the pipe nipple 112 with the height of the waste pipe 134.

The faceplate 124 of the carrier has a faceplate flange 120 that circumferentially surrounds the nipple 112. Located between the faceplate flange 120 and an outer wall 128 of the pipe nipple 112 is a gasket 116 circumferentially positioned in contact with the outer wall 128 and the faceplate flange 120. Located to the toilet side of the gasket 116 is a second flange 114. Flanges 114 can be moved relative to flange 120 to compress gasket 116 to form a seal between the faceplate 124 and the outer wall 128 of the pipe nipple 112.

Figure 2:
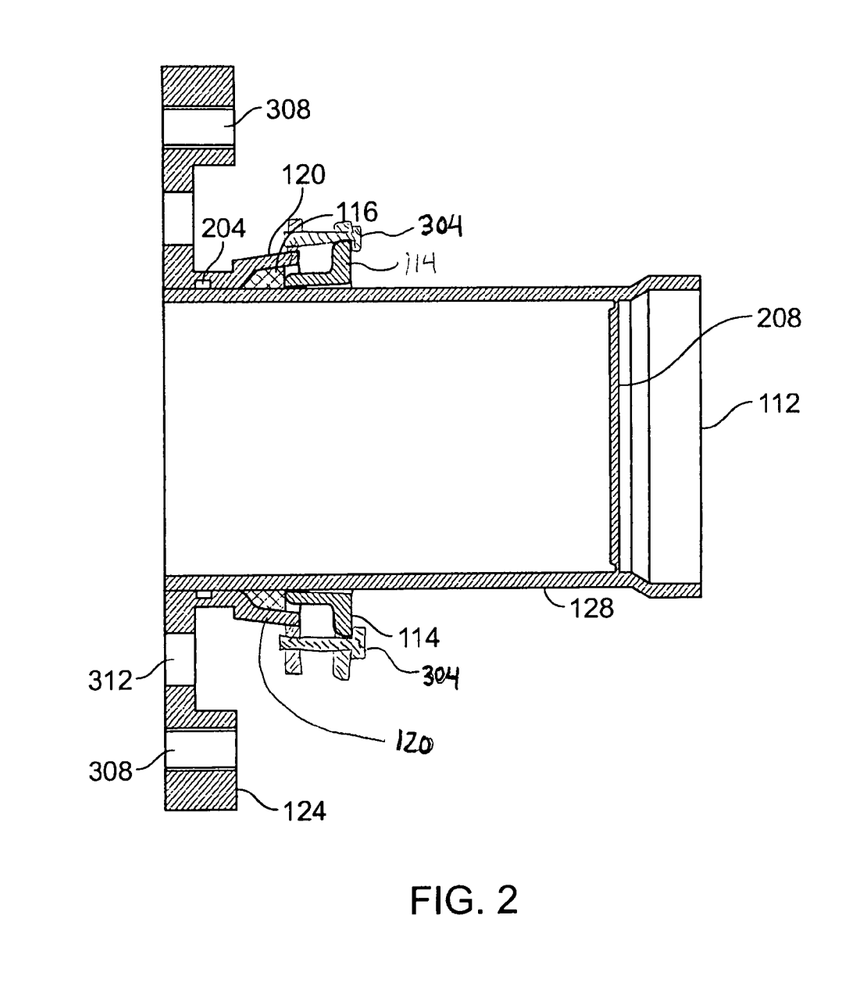
FIG. 2 is a cross-section of the wall hung toilet carrier taken along lines 2—2 in FIG. 3.

Referring to FIG. 2, outer wall 128 of the pipe nipple 112 is preferably smooth in that it is not threaded or otherwise marked and forms a seal with gasket 116. The seal is formed by virtue of compression of the gasket 116 against outer wall 128 by faceplate flange 120 and second flange 114. As the two flanges are brought toward one another, the gasket 116 is compressed toward the outer wall 128 resulting in a seal. The faceplate flange 120 also includes an O-ring 204 that forms a secondary seal with the outer wall 128. The pipe nipple 112, initially, has a punch out 208 that is removed after the seal between the faceplate 124 and the pipe nipple 112 has been tested. Faceplate 124 has slots 312 for connecting to the waste pipe. Slots 312 allow the faceplate 124 to attach to a variety of different vertical positions of waste pipes. Faceplate 124 also has holes 306 (FIG. 3) and 308 for receiving screws 106 for connecting to the toilet 102.

Figure 3:
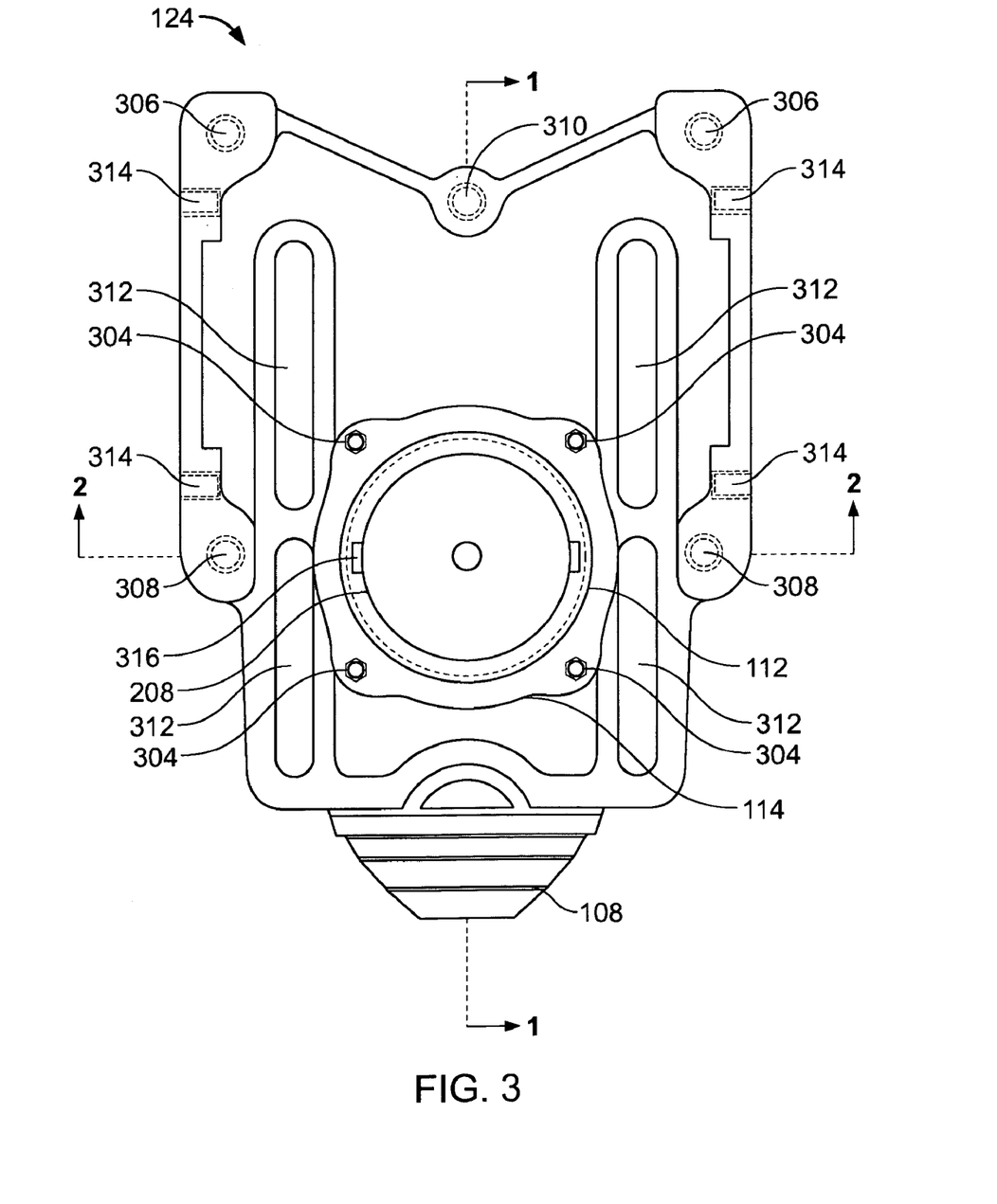
FIG. 3 is an end view of the wall hung toilet carrier.
Figure 4:
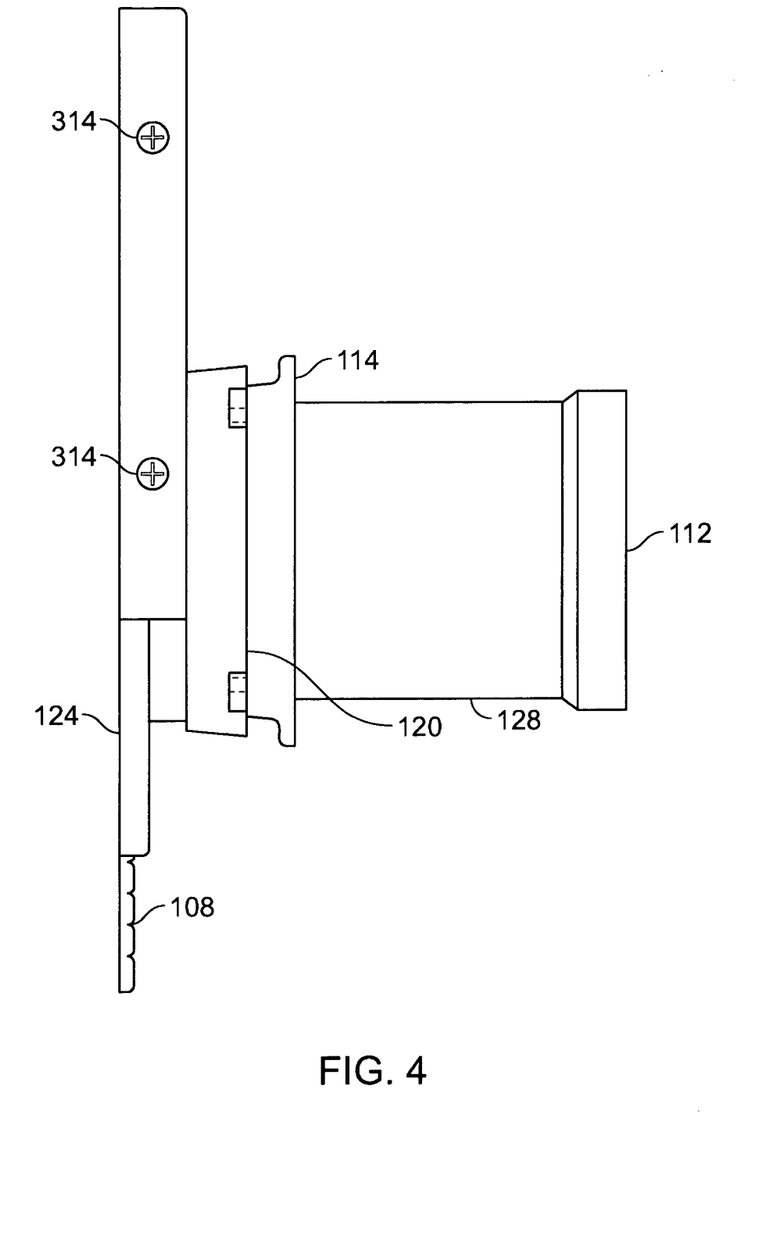
FIG. 4 is a side view of the wall hung toilet carrier.

Referring also to FIG. 3, flange 114 has four, uniformly spaced bolts 304 for attaching flange 114 to the faceplate flange 120 spaced uniformly around the pipe nipple 112. Faceplate 124 attaches to a siphon jet or standard flush toilet 102 via screw receiving holes 306 and 308. The faceplate 124 can be inverted and attached to a blow out or pressurized flush toilet by way of screw receiving holes 306 and 310. The faceplate 124 is attached to the waste pipe 134 via standard fasteners received in slots 312. The slots 312 allow for a variety of different pipe types and vertical placements. Faceplate 124 has positioning notches 108 that can be removed at each notch to facilitate attachment to low hung toilets. Referring to FIG. 4, faceplate 124 has threaded side holes 314 that receive fasteners for attachment of faceplate 124 to frame 126. Frame 126 has side slots 127 (FIG. 1) that permit vertical positioning of the faceplate 124 relative to the frame 126 and secure the carrier 100 to the floor 104. The pipe nipple has a punch out 208 and notches 316 to facilitate attachment to the toilet. Notches 316 provide and entry into a slot for interaction with male counterparts on the toilet 102 when nipple 112 is placed flush to the toilet and rotated.

Figure 5A:
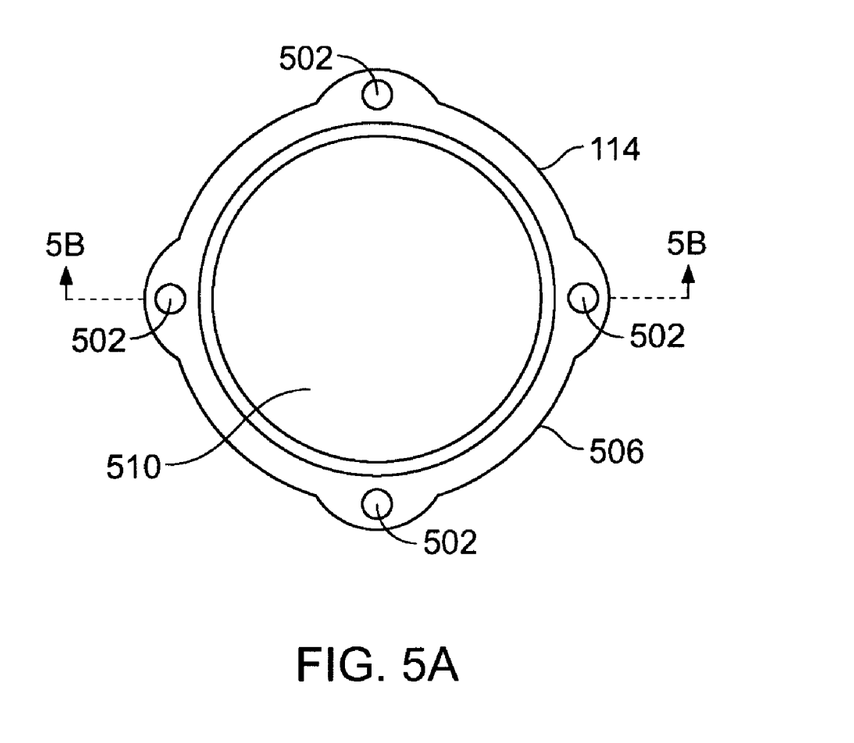
FIG. 5A is an illustration of a flange of the wall hung toilet carrier.
Figure 5B:
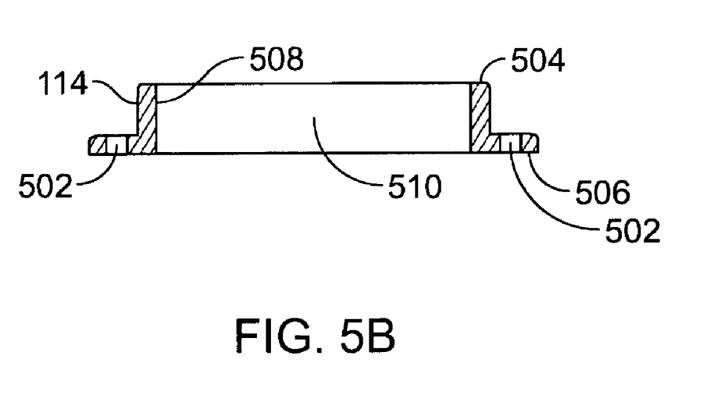
FIG. 5B is a cross-sectional view of the flange taken along lines 5B—5B in FIG. 5A.

Referring to FIGS. 5A and 5B flange 114 includes a lip 506 that defines 4 holes 502 through which bolts 304 (FIG. 3) extend for attaching flange 114 to the faceplate flange 120. Flange 114 has a wall 508 defining a through hole 510 through which pipe nipple 112 extends. Wall 508 has a compression face 504 that contacts gasket 116 (FIG. 1).

Figures 6A, 6B:
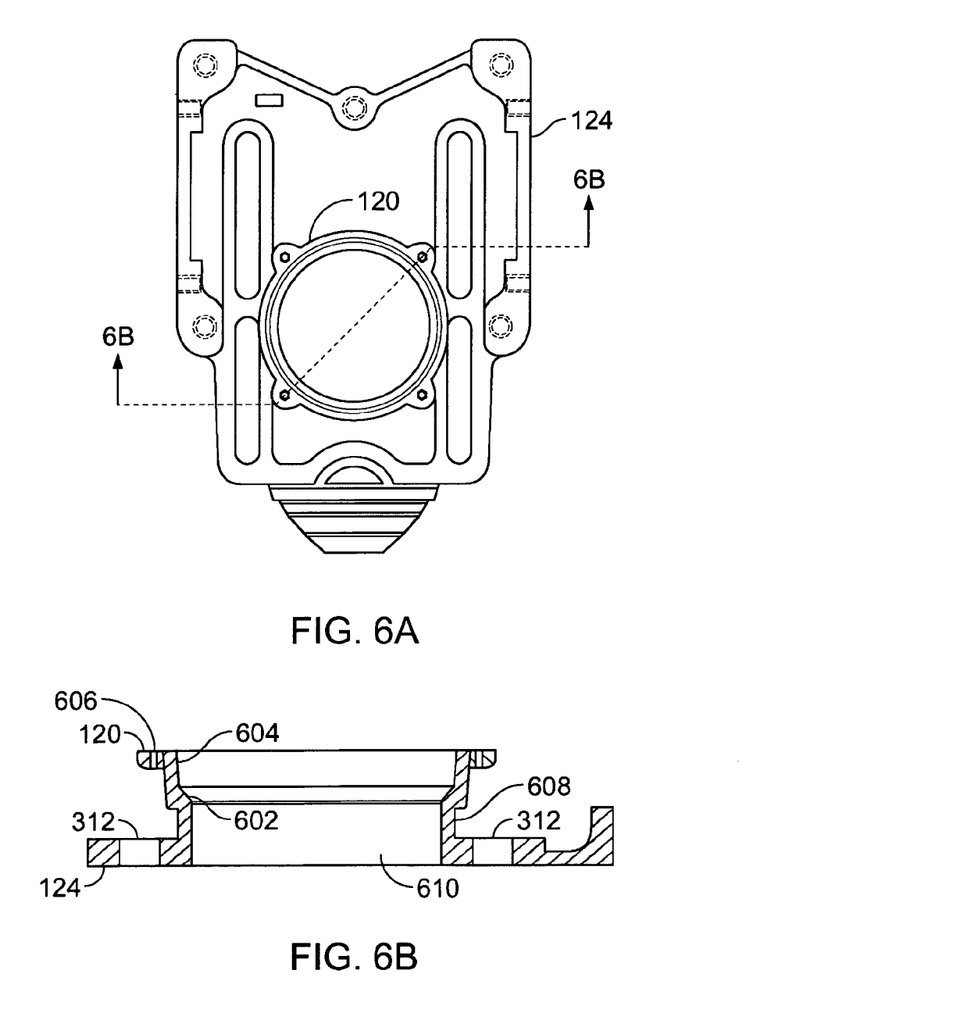
FIG. 6A is an illustration of a faceplate of the wall hung toilet carrier.
FIG. 6B is a cross-sectional view of the faceplate taken along lines 6B—6B in FIG. 6A.

Referring to FIGS. 6A and 6B, faceplate 124 has a wall 608 with a terminal portion that forms flange 120. Wall 608 defines a through hole 610 through which pipe nipple 112 extends. Wall 608 has a compression face 602 and an inner facing surface 604 that contact gasket 116. Face 602 is at an approximately 45° angle relative to surface 604. Flange 120 defines four holes 606 through which bolts 304 (FIG. 3) extend.

Figure 7:
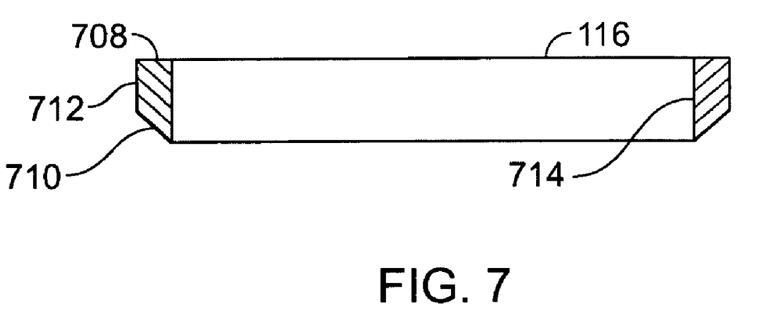
FIG. 7 is a cross-sectional view of a gasket of the wall hung toilet carrier.
Figure 8:
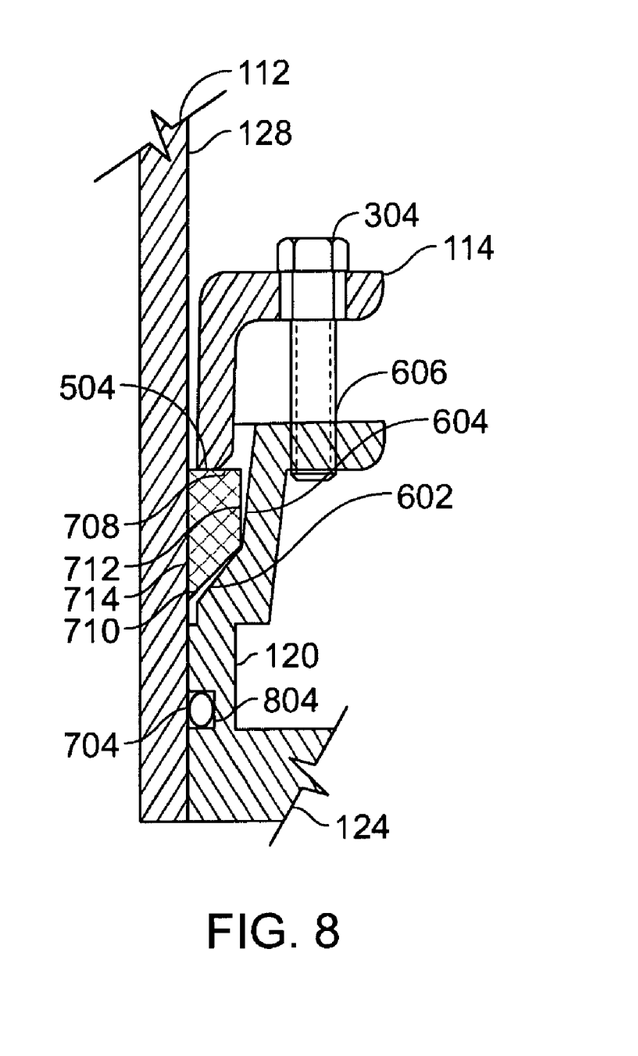
FIG. 8 is a cross-sectional view of a gasket-clamping portion of the wall hung toilet carrier.

Referring to FIGS. 7 and 8, the gasket 116 that forms the seal between the flanges and the pipe nipple 112 has a first compression face 708 that contacts face 504 of flange 114, a second compression face 710 that contacts face 602 of flange 120, an inner compression face 712 that contacts surface 604 of flange 120, and an outer sealing face 714 that contacts the outer wall of the pipe nipple. Compression face 710 is at an approximate 45° angle relative to 712. Flange 114 is drawn toward faceplate flange 120 by tightening compression bolts 304 resulting in compression of gasket 116 between the compression faces 504 and 602, surface 604 and the outer wall of the pipe nipple. This forms a circumferential seal along the outer face 714 of gasket 116 with the pipe nipple 112. Prior to tightening bolt 304, to aid assembly, pipe nipple 112 and faceplate 124 are initially sealed by O-ring 704 received with a notch 804 in faceplate 124. Gasket 116 forms a leak tight seal and also holds the pipe nipple such that the pipe nipple does not slide relative to the waste pipe and toilet.

The O-ring and gaskets can be made from any suitable gasket material, for example, the gaskets can be made from Neoprene. The pipe nipple is molded with no threads and can be made from any suitable material for carrying waste including for example, molded plastic including molded resins and specifically PVC and ABS. The faceplate also has no threads along its inner face and may be made from any suitable material including cast iron. The frame can also be cast iron or any other material suitable to the purpose. The toilet carrier can be used with different types of waste pipes including vertical and horizontal pipes. The carrier has flexibility built into its design in order to be able to service as many types of toilets as possible. For example, the frame may be inverted to support a blow out pressurized flush toilet, or can be used upright for a siphon jet toilet.

A number of embodiments of the invention have been described. Nevertheless, it will be understood that various modifications may be made without departing from the spirit and scope of the invention. Accordingly, other embodiments are within the scope of the following claims.

What is claimed is:

1. A plumbing system, comprising:
   a wall-hung toilet disposed at a first side of a structure wall;
   a waste pipe disposed beyond an opposite, second side of the structure wall; and
   a floor-mounted toilet carrier assembly coupling the wall-hung toilet to the waste pipe, comprising:
      a connecting pipe extending through the structure wall to place the wall-hung toilet and waste pipe in fluid communication, at least a portion of the connecting pipe in a region beyond the second side of the structural wall having a smooth outer wall surface;
      a first flange positioned about the portion of the connecting pipe adjacent to the waste pipe;
      a second flange disposed for movement along the portion of the connecting pipe and generally toward the first flange; and
      a gasket disposed for compression between the first flange and the second flange.

2. The plumbing system of claim 1 wherein the gasket is made of neoprene.

3. The plumbing system of claim 1 wherein the toilet comprises a siphon jet toilet.

4. The plumbing system of claim 1 wherein the toilet is a blowout toilet.

5. The plumbing system of claim 1 wherein the toilet carrier further comprises a faceplate attached to the toilet, the faceplate including the first flange.

6. The plumbing system of claim 5 wherein the toilet carrier further comprises a frame attached to the faceplate, the frame permitting vertical adjustment of the position of the faceplate.

7. The plumbing system of claim 1 wherein the gasket has a trapezoidal cross-section.

8. The plumbing system of claim 7 wherein the gasket has a first surface in contact with the second flange, an angled, second surface in contact with the first flange, a flat, third surface in contact with the first flange, and a flat, fourth surface forming a seal with the portion of the connecting pipe.

9. The plumbing system of claim 1 further comprising a fastener for adjusting the relative position of the first and second flanges such that the flanges compress the gasket to form a seal.

10. A floor-mounted toilet carrier for coupling a wall hung toilet disposed at a first side of a structure wall to a waste pipe disposed beyond an opposite, second side of the structure wall, comprising:
- a connecting pipe extending through the structure wall to place the wall-hung toilet and waste pipe in fluid communication, at least a portion of the connecting pipe in a region beyond the second side of the structural wall having a smooth outer wall surface;
- a first flange positioned about the portion of the connecting pipe adjacent to the waste pipe;
- a second flange disposed for movement along the portion of the connecting pipe and generally toward the first flange; and
- a gasket disposed for compression between the first flange and the second flange.

11. The plumbing system of claim 1 wherein the toilet carrier further comprises a floor-mounted frame.

12. The plumbing system of claim 11 wherein the frame is coupled to the first flange.

13. The toilet carrier of claim 10 further comprising a faceplate including the first flange and a frame permitting vertical adjustment of the position of the faceplate.

14. The toilet carrier of claim 10 wherein the gasket has a trapezoidal cross-section.

15. The toilet carrier of claim 14 wherein the gasket has a first surface in contact with the second flange, an angled, second surface in contact with the first flange, a flat, third surface in contact with the first flange, and a flat, fourth surface forming a seal with the portion of the connecting pipe.

16. The toilet carrier of claim 10 further comprising a fastener for adjusting the relative position of the first and second flanges such that the flanges compress the gasket to form a seal.

17. A plumbing system, comprising:
- a wall hung toilet;
- a waste pipe; and
- a toilet carrier assembly coupling the toilet to the waste pipe, including:
  - a connecting pipe positioned to place the toilet and waste pipe in fluid communication, at least a portion of the connecting pipe having a smooth outer wall surface;
  - a first flange extending about the portion of the connecting pipe adjacent to the waste pipe;
  - a second flange disposed for movement along the portion of the connecting pipe and generally toward the first flange; and
  - a gasket disposed for compression between the first flange and the second flange, the gasket having a trapezoidal cross-section.

18. The plumbing system of claim 17 wherein the gasket has a first surface in contact with the second flange, an angled, second surface in contact with the first flange, a flat, third surface in contact with the first flange, and a flat, fourth surface forming a seal with the portion of the connecting pipe.

19. The plumbing system of claim 1 wherein the connecting pipe is non-threadably connected to the waste pipe.

20. The plumbing system of claim 1 further comprising a fastener extending through the first flange and the second flange to compress the gasket between the first and second flanges and the connecting pipe.

21. The plumbing system of claim 1 wherein compression of the gasket forms a seal at an interface between the connecting pipe and the waste pipe.

22. The plumbing system of claim 10 wherein compression of the gasket forms a seal at an interface between the connecting pipe and the waste pipe.

* * * * *